United States Patent
Kim et al.

(10) Patent No.: US 12,076,877 B2
(45) Date of Patent: Sep. 3, 2024

(54) POLISHING PLATENS AND POLISHING PLATEN MANUFACTURING METHODS

(71) Applicant: Applied Materials, Inc., Santa Clara, CA (US)

(72) Inventors: Bum Jick Kim, Irvine, CA (US); Danielle Loi, San Jose, CA (US); Jay Gurusamy, Santa Clara, CA (US); Steven M. Zuniga, Soquel, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 0 days.

(21) Appl. No.: 16/884,888

(22) Filed: May 27, 2020

(65) Prior Publication Data

US 2020/0376700 A1    Dec. 3, 2020

Related U.S. Application Data

(60) Provisional application No. 62/855,894, filed on May 31, 2019.

(51) Int. Cl.
*B26D 3/00* (2006.01)
*B23B 1/00* (2006.01)
(Continued)

(52) U.S. Cl.
CPC ............... *B26D 3/006* (2013.01); *B23B 1/00* (2013.01); *B24B 37/10* (2013.01); *B24B 37/11* (2013.01);
(Continued)

(58) Field of Classification Search
None
See application file for complete search history.

(56) References Cited

U.S. PATENT DOCUMENTS 6,036,586 A    3/2000  Ward
6,220,942 B1   4/2001  Tolles et al.
(Continued)

FOREIGN PATENT DOCUMENTS

CN    1842577 A    10/2006
CN    101157199 A   4/2008
(Continued)

OTHER PUBLICATIONS

Machine Generated English Translation of the Bib Data of KR20140090688. Published Jul. 17, 2014 (Year: 2014).*
(Continued)

*Primary Examiner* — Sylvia MacArthur
(74) *Attorney, Agent, or Firm* — Patterson & Sheridan LLP.

(57) ABSTRACT

Embodiments of the present disclosure generally relate to methods of manufacturing polishing platens for use on a chemical mechanical polishing (CMP) system and polishing platens formed therefrom. A method of manufacturing a polishing includes positioning a polishing platen on a support of a manufacturing system. The manufacturing system includes the support and a cutting tool facing there towards. Here, the polishing platen includes a cylindrical metal body having a polymer layer disposed on a surface thereof and the polymer layer has a thickness of about 100 μm or more. The method further includes removing at least a portion of the polymer layer using the cutting tool to form a polishing pad-mounting surface. Beneficially, the method may be used to form a pad-mounting surface having a desired flatness or shape, such as a concave or convex shape.

17 Claims, 8 Drawing Sheets

(51) Int. Cl.
    *B24B 37/10*         (2012.01)
    *B24B 37/11*         (2012.01)
    *B24B 37/30*         (2012.01)
    *B24B 41/04*         (2006.01)
    *B24D 3/00*          (2006.01)
    *B26D 1/02*          (2006.01)

(52) U.S. Cl.
    CPC .............. *B24B 37/30* (2013.01); *B24B 41/04* (2013.01); *B24D 3/00* (2013.01); *B26D 1/02* (2013.01)

(56) References Cited

U.S. PATENT DOCUMENTS

| | | | |
|---|---|---|---|
| 6,299,519 | B1 | 10/2001 | Easter et al. |
| 6,793,561 | B2 * | 9/2004 | Bachand ............... B24B 37/013 |
| | | | 451/28 |
| 6,814,834 | B2 | 11/2004 | Ward |
| 7,121,933 | B2 * | 10/2006 | Kim ........................ B24D 7/14 |
| | | | 451/504 |
| 7,134,947 | B2 | 11/2006 | Stark et al. |
| 7,156,722 | B2 | 1/2007 | Min et al. |
| 7,585,425 | B2 | 9/2009 | Ward |
| 10,562,147 | B2 | 2/2020 | Butterfield et al. |
| 2004/0053566 | A1 | 3/2004 | Tolles et al. |
| 2004/0072518 | A1 | 4/2004 | Prabhu et al. |
| 2009/0247057 | A1 | 10/2009 | Kobayashi et al. |
| 2019/0143478 | A1 * | 5/2019 | Lia ................... H01L 21/30625 |
| | | | 438/692 |
| 2020/0376700 | A1 * | 12/2020 | Kim ........................ B24D 3/00 |

FOREIGN PATENT DOCUMENTS

| | | | | | |
|---|---|---|---|---|---|
| CN | 101175603 | A | | 5/2008 | |
| CN | 107344327 | A | | 11/2017 | |
| EP | 0850725 | B1 | | 11/2002 | |
| EP | 1588802 | A1 | | 10/2005 | |
| JP | H09262759 | A | * | 10/1997 | |
| JP | 2000135671 | A | | 5/2000 | |
| JP | 2003336017 | A | | 11/2003 | |
| JP | 2008238375 | A | | 10/2008 | |
| JP | 2012156505 | A | * | 8/2012 | ............. B24B 37/08 |
| KR | 20140090688 | A | * | 7/2014 | |
| TW | 200610610 | A | | 4/2006 | |
| TW | I496660 | B | | 8/2015 | |
| TW | 201831271 | A | | 9/2018 | |
| TW | I652735 | B | | 3/2019 | |

OTHER PUBLICATIONS

Machine Generated English Translation of the claims of KR20140090688. Published Jul. 17, 2014 (Year: 2014).*
Machine Generated English Translation of the description of KR20140090688. Published Jul. 17, 2014 (Year: 2014).*
International Search Report and Written Opinion of the International Searching Authority for PCT/US2020/034740, mailed Sep. 10, 2020, 11 pages.
Taiwan Office Action dated Jul. 15, 2022 for Application No. 109117966.
Japanese Office Action dated Dec. 6, 2022 for Application No. 2021-569865.
Taiwan Office Action dated Dec. 28, 2022 for Application No. 109117966.
Chinese Office Action dated Oct. 16, 2023 for Application No. 202080037438.0.
Korean Office Action dated Oct. 30, 2023 for Application No. 10-2021-7042882.
Japanese Office Action dated Jun. 27, 2023, for JP Application No. 2021-569865.
Chinese Office Action date Feb. 24, 2023 for Application No. 202080037438.0.
Taiwan Office Action dated Jun. 4, 2024 for Application No. 109117966.

* cited by examiner

POLISHING PLATENS AND POLISHING PLATEN MANUFACTURING METHODS

CROSS-REFERENCE TO RELATED APPLICATIONS

This application claims priority to U.S. Provisional Application Ser. No. 62/855,894, filed on May 31, 2019, which is herein incorporated by reference in its entirety.

BACKGROUND

Field

Embodiments described herein generally relate to polishing platens to be used on a chemical mechanical polishing (CMP) system and polishing platen manufacturing methods related thereto.

Description of the Related Art

Chemical mechanical polishing (CMP) is commonly used in the manufacturing of high-density integrated circuits to planarize or polish a layer of material deposited on a substrate. In a typical CMP process, a substrate is retained in a carrier head that presses the backside of the substrate towards a rotating polishing pad in the presence of a polishing slurry. Material is removed across the material layer surface of the substrate in contact with the polishing pad through a combination of chemical and mechanical activity which is provided by the polishing slurry and a relative motion of the substrate and the polishing pad.

Typically, the polishing pad is disposed on a disk-shaped polishing platen having a surface which has been formed to have a desired flatness. The polishing pad is secured to the surface of the platen using a pressure sensitive adhesive layer interposed there between. Generally, polishing pads have a limited useful lifetime which thus necessitates that the polishing pad be replaced on a regular basis to prevent degradation of CMP substrate processing results. Replacing the polishing pad generally comprises manually pulling the polishing pad from the surface of the polishing platen with enough force to overcome the tenacity of the adhesive interposed there between. A typical force required to remove a used polishing pad from the surface of a polishing platen can be substantial which may lead to personal injury, damage to the polishing system including damage to the polishing platen, or both.

Treating the surface of the polishing platen, such as by applying a coating of low-adhesion-material thereto, e.g., a "non-stick" polymer coating, can desirable reduce the force required to remove a used polishing pad therefrom. The treated surface may also desirably prevent corrosion of the polishing platen due to the exposure to the CMP polishing chemistry during normal processing. Unfortunately, the relatively high temperature processes, which may be used to apply a low adhesion material, can undesirably deform, e.g., warp, the disk-shaped polishing platen thus reducing the surface flatness thereof. Also, typical conventional polymer coating thicknesses are large enough to significantly deform under the compressive load applied to the polishing pad and polishing platen by the substrate and portions of the polishing head (e.g., substrate holder) during a CMP process. The amount of local and overall deformation of a polishing platen is generally not consistent from coated platen to coated platen, which contributes to inconsistent substrate polishing results between polishing platens of a multi-platen polishing system and/or between single platen and multi-platen polishing systems.

Accordingly, there is a need in the art for polishing platen manufacturing methods, and polishing platens formed therefrom, that solve the problems described above.

SUMMARY

Embodiments of the present disclosure generally relate to methods of manufacturing polishing platens for use on a chemical mechanical polishing (CMP) system, polishing platens formed therefrom, and polishing method using the polishing platens.

In one embodiment, a method of manufacturing a polishing platen is provided. The method includes positioning a polishing platen on a support of a manufacturing system. The manufacturing system includes the support and a cutting tool facing there towards. Here, the polishing platen includes a cylindrical metal body having a polymer layer disposed on a surface thereof and the polymer layer has a thickness of about 100 µm or more. The method further includes removing at least a portion of the polymer layer using the cutting tool to form a polishing pad-mounting surface. Beneficially, the method may be used to form a pad-mounting surface having a desired flatness or shape, such as a concave or convex shape.

In another embodiment, a polishing platen is provided. The polishing platen features a cylindrical metal body and a polymer coating layer disposed on the metal body to form a circular pad-mounting surface. The pad-mounting surface has a first surface height at a first radius and a second surface height at a second radius. The second radius is disposed radially inward of the first radius. The first and second surface heights are measured as distances from a reference plane that is parallel the pad-mounting surface at the first radius. A difference between the first and second surface heights is about 25 µm or more. In some embodiments, the first and second surface heights are averaged from a plurality of distance measurements taken at a corresponding plurality of equidistant locations along the respective radiuses.

In another embodiment, a polishing platen features a cylindrical metal body and a polymer coating layer disposed on the metal body to form a pad-mounting surface where a thickness of the polymer coating layer changes from a first radius of the pad-mounting surface to a second radius disposed radially inward from the first radius. In some embodiments, the thickness at the second radius is averaged from a plurality of thickness measurements taken at a corresponding plurality of equidistant locations along the second radius and a difference between the thickness at the first radius and the second radius is about 25 µm or more.

In another embodiment, a method of polishing a substrate is provided. The method includes urging a substrate against a surface of a polishing pad in a presence of a polishing fluid. Here, the polishing pad is disposed on a pad-mounting surface of a polishing platen. The polishing platen includes a cylindrical metal body and coating layer disposed on a surface of the metal body to form the polishing pad-mounting surface. The mean thickness of the coating layer across the pad-mounting surface is less than about 250 µm and a variation in the thickness of the coating layer across a diameter of the pad-mounting surface varies by about 25 µm or more. The pad-mounting surface may have a flatness of about 25 µm or less or may have a concave or convex shape.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1A:
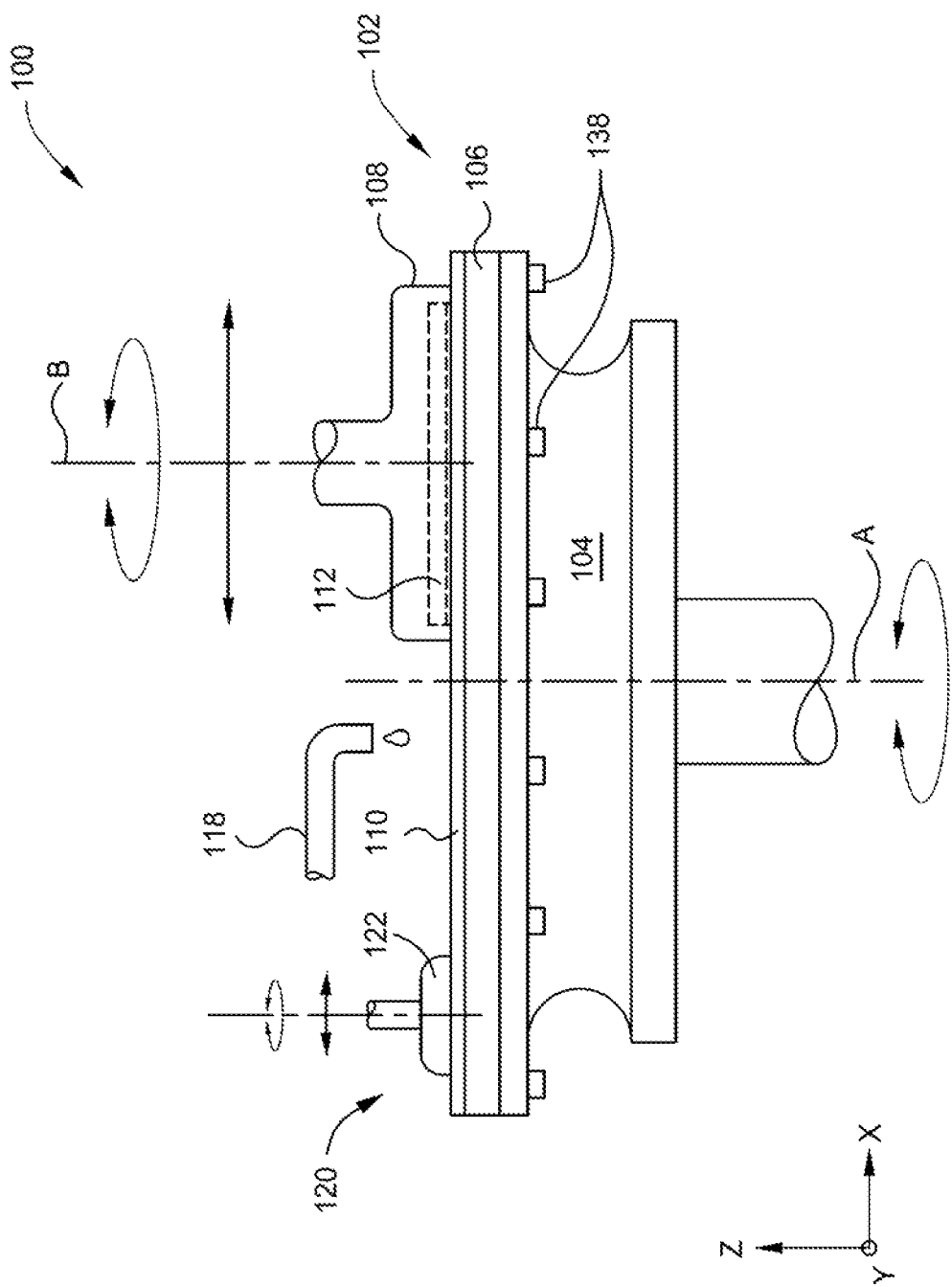
FIG. 1A is a schematic side view of an exemplary polishing system, according to one embodiment, which is configured to use a polishing platen formed according to the methods set forth herein.

Embodiments of the present disclosure generally relate to methods of manufacturing polishing platens for use on a chemical mechanical polishing (CMP) system and polishing platens formed therefrom. The polishing platens formed according to embodiments herein generally feature a structural component, such as a cylindrical platen body formed of metal, and a low-adhesion-material layer disposed on a surface of the platen body to provide a polishing pad-mounting surface. The low-adhesion-material layer desirably reduces the amount of force required to remove a polishing pad from the polishing pad-mounting surface once the polishing pad has reached the end of its useful lifetime and further protects the metal of the platen body from polishing fluid caused corrosion.

Often, the processes required to form and bond the low-adhesion-material to the surfaces of the platen body require heating and maintaining the platen body at temperatures in excess of 300° C., for example up to 350° C. or more, during the material deposition process. Typically, the high temperature process used to form the low-adhesion-material layer causes the cylindrical platen body to become deformed, which undesirably reduces the flatness of the pad-mounting surface thereof. For example, in some embodiments the pad-mounting surface of the platen body is machined to have a flatness deviation from a least squares reference plane of about 25 µm or less before a coating layer of the low-adhesion-material is formed thereon. After the coating layer is formed on the platen body, the pad-mounting surface may suffer from a lack of flatness. For example, the pad-mounting surface may have a deviation from the reference plane by about 25 µm or more, such as between about 25 µm and about 150 µm, even though the low-adhesion-material coating layer may have a thickness uniformity standard deviation about 3 µm or less.

Generally, the distortions in the shape of the polishing platen following the low-adhesion-material coating process are unpredictable. Thus, the low-adhesion material coating process may result different surface profiles for different polishing platens formed using the same material coating process. For example, two different disk-shaped polishing platens formed using generally the same low-adhesion-material coating process may each have a different resulting surface shape comprising such as different hyperbolic paraboloid surface shapes, or different random undulating surface shapes, in various degrees of deviation from a least squares reference plane thereof. Unfortunately, the variations in surface shape of different polishing platens formed using the same surface coating methods undesirably result in non-uniform substrate processing results from polishing platen to polishing platen within a multi-platen CMP system and/or across a plurality of single platen CMP systems or multi-platen CMP systems. Therefore, embodiments herein provide methods for controlling the flatness and/or surface shape of a polishing platen during the manufacturing thereof and polishing platens formed using the methods. In one embodiment, a method includes forming a relatively thick low-adhesion-material layer on the disk-shaped platen body before removing portions of the material layer therefrom to provide a polishing platen having a desired surface flatness and/or surface shape.

Figure 1C:
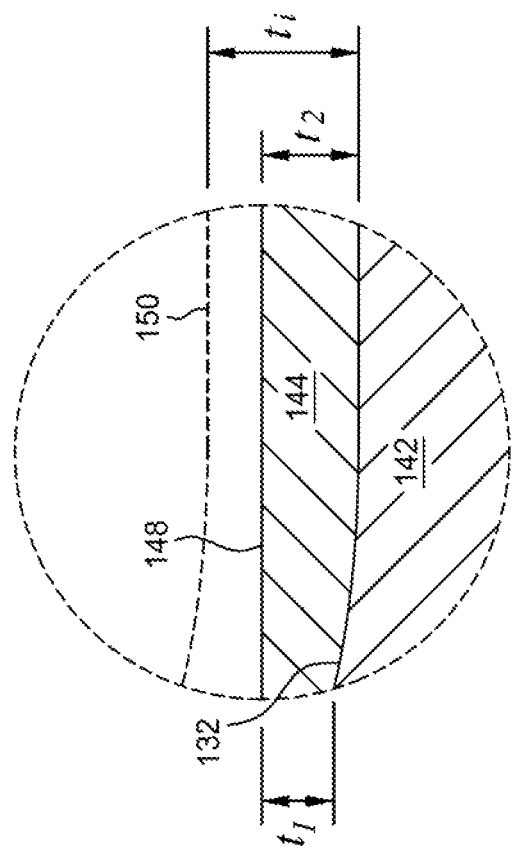
FIG. 1C is a close up view of a portion of FIG. 1B.
Figure 1B:
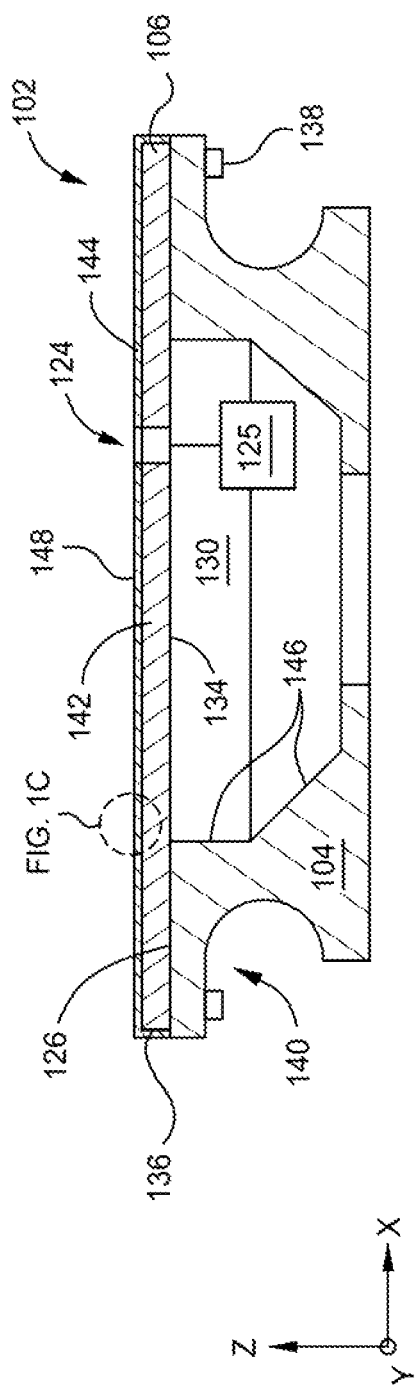
FIG. 1B is a schematic cross sectional view of the platen assembly of FIG. 1A, according to one embodiment.

FIG. 1A is a schematic side view of an exemplary polishing system 100, which includes a platen assembly 102, formed using the methods described herein. FIG. 1B is a schematic cross sectional view of the platen assembly 102 of FIG. 1A. Herein, the platen assembly 102 includes a lower platen 104 and a polishing platen 106 disposed on and coupled to the lower platen 104. FIG. 1C is a close up view of a portion of the polishing platen 106 shown in FIG. 1B.

The exemplary polishing system 100 includes the platen assembly 102 having a polishing pad 110 mounted thereon, a substrate carrier 108 disposed above the polishing pad 110 and facing there towards. The platen assembly 102 is rotatable about an axis A, the substrate carrier 108 is rotatable about an axis B and is configured to sweep back and forth from an inner diameter to an outer diameter of the platen assembly to, in part, reduce uneven wear of the surface of the polishing pad 110. The polishing system 100 further includes a fluid delivery arm 118 positioned above the polishing pad 110 which may be used to deliver polishing fluids thereto and a pad conditioning assembly 120 disposed above the polishing pad 110 and facing there towards.

In a typical CMP process, the rotating and/or sweeping substrate carrier 108 exerts a downforce against a substrate 112 (shown in phantom) disposed therein to urge a material surface of the substrate 112 against the polishing pad 110 as the polishing pad 110 rotates there beneath. The substrate 112 is urged against the polishing pad 110 in the presence of the one or more polishing fluids delivered by the fluid delivery arm 118. A typical polishing fluid comprises a slurry formed of an aqueous solution having abrasive particles suspended therein. Often, the polishing fluid contains a pH adjuster and other chemically active components, such as an oxidizing agent, to enable chemical mechanical polishing of the material surface of the substrate 112.

The pad conditioning assembly 120 is used to urge a fixed abrasive conditioning disk 122 against the surface of the polishing pad 110 rotating there beneath before, after, or during polishing of the substrate 112. Conditioning the polishing pad 110 with the conditioning disk 122 maintains the polishing pad 110 in a desired condition by abrading, rejuvenating, and removing polish byproducts and other debris from, the polishing surface of the polishing pad 110.

In some embodiments, the polishing system 100 further includes a processing endpoint detection system 125, which is used to monitor the thickness of a material layer or to monitor the removal of a material layer from a field surface of the substrate 112 during the polishing process. The processing endpoint detection system 125 includes one or more sensors, such as an eddy current sensor or an optical sensor, which are housed in a cavity 130 (FIG. 1B) of the platen assembly 102.

The platen assembly 102 (FIGS. 1A-1C) includes a lower platen 104 and a polishing platen 106 disposed on the lower platen 104 and coupled thereto. Here, the lower platen 104 has a top down circular shape, an annular polishing platen mounting surface 126, and one or more recessed surfaces 146 disposed radially inward from the polishing platen mounting surface 126, which together with the polishing platen 106, defines the cavity 130. The polishing platen 106 is disposed on the polishing platen mounting surface 126 and is secured thereto using a plurality of fasteners 138. Here, the plurality of fasteners are disposed through corresponding openings formed in an annular flange shaped portion 140 of the lower platen 104.

The polishing platen 106 is formed of a cylindrical disk-shaped platen body 142 and includes a low-adhesion-material coating layer 144 formed on one or more surfaces of the platen body 142. For example, here the platen body 142 has a first surface (the platen body surface 132), a second surface 134 that is opposite of the platen body surface 132 and substantially parallel thereto, and a radially outward facing circumferential surface 136 connecting the platen body surface 132 to the second surface 134. The material coating layer 144 is formed on the platen body surface 132 to provide a low-adhesion pad-mounting surface 148 and is further formed on the circumferential surface 136 to protect the platen body 142 from polishing fluid caused corrosion. In some embodiments, the polishing platen 106 includes an aperture 124, such as a window, formed there through. The endpoint detection system 125 may be used to monitor the substrate polishing processed using one or more sensors positioned proximate to the aperture 124.

The polishing platen assembly 102, and thus the polishing platen 106, may be suitably sized for any desired polishing system. For example, here the sized for a multi-platen polishing system configured to polish a 300 mm diameter substrates and has diameter of more than about 300 mm, such as between about 500 mm and about 1000 mm, or more than about 500 mm. Generally, the polishing platen 106 is relatively thin, where a thickness thereof is between about 20 mm and about 150 mm, or about 100 mm or less, such as about 80 mm or less, about 60 mm or less, or about 40 mm of less. Appropriate adjustments may be made to the size of the polishing platen 106 for polishing systems configured to polish different sized substrates, e.g., 200 mm diameter or 450 mm diameter substrates, or for a polishing platen 106 sized for concurrent polishing of multiple substrates. In some embodiments, a ratio of a diameter to a thickness of the polishing platen 106 is about 3:1 or more, about 5:1 or more, about 10:1 or more, about 15:1 or more, about 20:1 or more, about 25:1 or more, about 30:1 or more, about 40:1 or more, or for example, about 50:1 or more.

The platen body 142 is formed of a suitably rigid, light weight, and polishing fluid corrosion resistant material, such as aluminum, an aluminum alloy (e.g., 6061 Aluminum), or stainless steel. The coating layer 144 typically comprises a polymer material formed of one or more fluorine-containing polymer precursors or melt-processable fluoropolymers, such as perfluoroalkoxy polymer (PFA), fluorinated ethylene-propylene (FEP), monofluoroalkyl polymer (MFA), olytetrafluoroethylene (PTFE), tetrafluoroethylene-ethylene (ETFE), polychlorotrifluoroethylene (PCTFE), polyvinylidene fluoride (PVF2), and copolymers formed from a combination of more than one of the polymer precursors thereof. In some embodiments, the coating layer 144 is formed of a perfluoroalkoxy alkane (PFA), e.g., a copolymer of tetrafluoroethylene and one or more perfluoroethers ($C_2F_3OR^f$, where $R^f$ is a perfluorinated group such as trifluoromethyl ($CF_3$)). In other embodiment, the material coating layer 144 may be formed of polyphenylene sulfide (PPS), polyetheretherketone (PEEK), thermoplastic polyimide (TPI), polyetherimide (PEI), polyamideimide (PAI), liquid crystal polymers (LCP), combinations thereof, and/or in combination with one or more fluorine-containing polymer.

Herein, the material coating layer 144 is formed by forming a first polymer layer 150 (shown in phantom in FIG. 1C) on the surface of the platen body 142 before removing portions of the first polymer layer 150 to provide a pad-mounting surface 148 having a desired flatness or shape. Examples of suitable methods which may be used to form the first polymer layer 150 include dipping, spraying, e.g., a plasma spray coating method or a thermal spray coating method, and electrostatic deposition of a liquid or powder polymer precursor. In some embodiments, forming the first polymer layer 150 includes heating the platen body 142 and the polymer or polymer precursor material deposited thereon to a temperature of more than about 250° C., such as more than about 300° C., or more than about 350° C.

In some embodiments, the first polymer layer 150 is formed to have a thickness $t_i$ of about 100 µm, such as about 120 µm or more, about 140 µm or more, about 160 µm or more, about 180 µm or more, for example about 200 µm or more. Herein, the thickness $t_i$ of the first polymer layer 150 is substantially uniform across a platen body surface 132 disposed there beneath. For example, in one embodiment, a standard deviation a of a plurality of measurements of the thickness $t_i$ of the first polymer layer 150 taken in uniform increments across a diameter of the platen body surface 132 is less than about 10 µm, such as less than about 9 µm, less than about 8 µm, less than about 7 µm, less than about 6 µm, or for example, less that about 5 µm.

In some embodiments, the platen body surface 132, and thus the surface of the first polymer layer 150, suffer from a lack of flatness where at least some portions of the surface of the first polymer layer 150 deviate from a reference plane, such as a least squares reference plane, by about 25 µm or more, such as by about 50 µm or more, about 75 µm or more, about 100 µm or more, about 150 µm or more, about 175 µm or more, about 200 µm or more, or, for example, between about 25 µm and about 200 µm. Thus, in some embodiments, after the first polymer layer 150 is formed on the platen body 142, at least portions thereof are removed to form a second polymer layer, herein the material coating layer 144. Removing at least portions of the first polymer layer 150 forms a polishing platen 106 with a pad-mounting surface 148 having a desired flatness or surface shape. A method removing at least a portion of the first polymer layer 150 to form a polishing platen 106 having a desired flatness or surface shape is set forth in FIG. 2.

Figure 2:
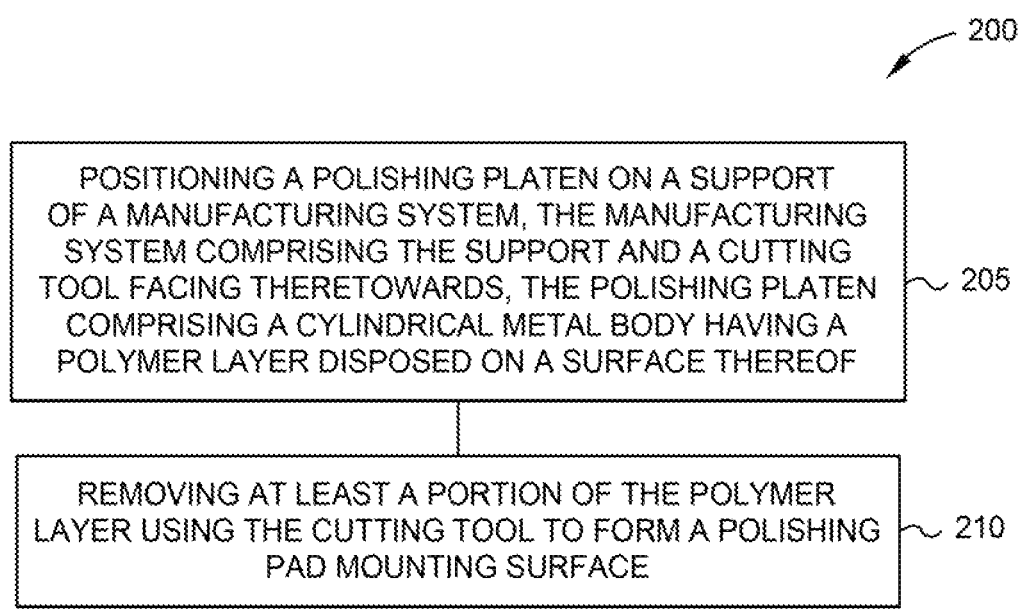
FIG. 2 is a diagram illustrating a method of manufacturing a polishing platen, according to one embodiment.
Figure 3:
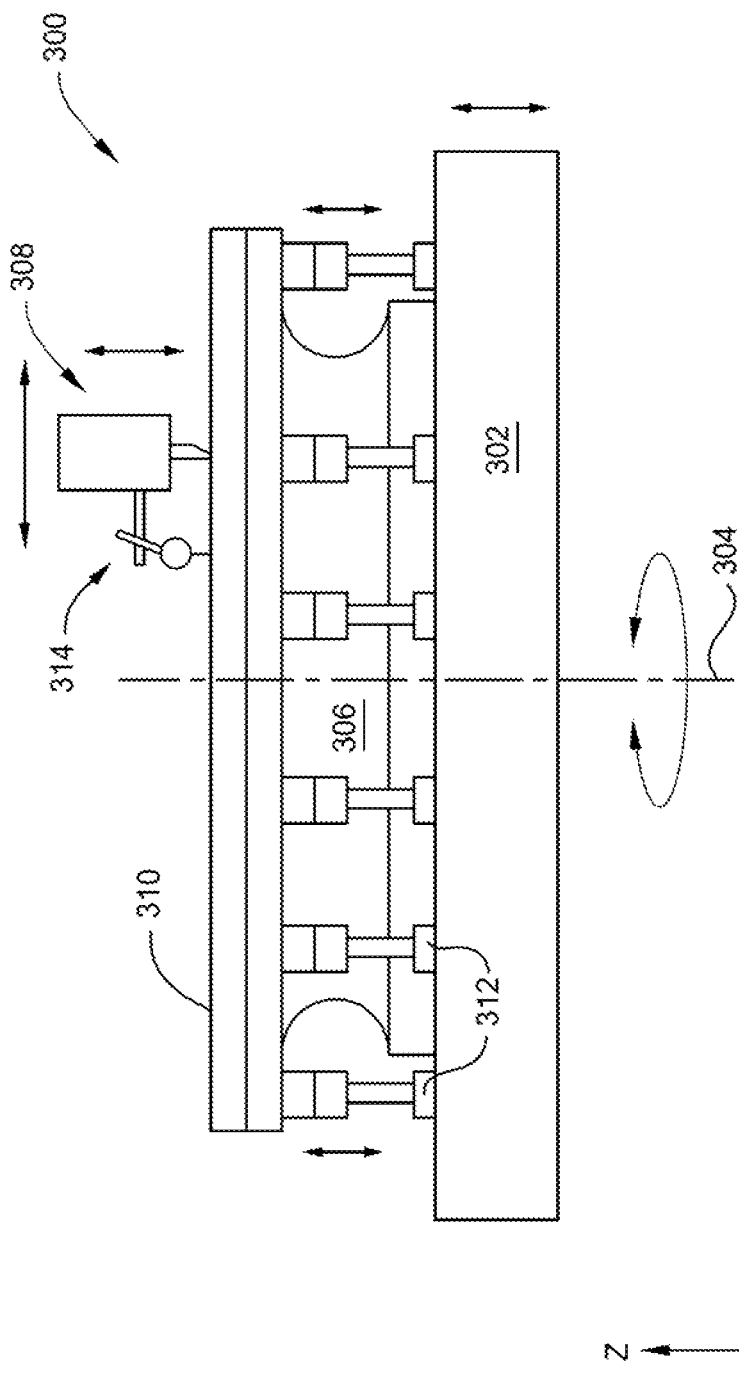
FIG. 3 is a schematic side view of a manufacturing system that may be used to practice the methods set forth in FIG. 2, according to one embodiment.

FIG. 2 is a diagram illustrating a method 200 of forming a desired shape in a pad-mounting surface of a polishing platen, according to one embodiment. FIG. 3A illustrates a manufacturing system 300, according to one embodiments, which may be used to practice the method 200.

At activity 202, the method 200 includes positioning a polishing platen 310 on a manufacturing support of a manufacturing system 300 used for shaping metals or other rigid material, such as a lathe or a milling machine. Here, the manufacturing system 300 is a vertical turning lathe which features a support spindle 302 which is rotatable about a spindle axis 304, a mounting fixture 306 secured to the support spindle 302, and a cutting tool 308 disposed above the support spindle 302 and facing there towards. Here, the mounting fixture 306 is substantially similar or the same as the lower platen 104 describe above in FIGS. 1A-1B. The polishing platen 310 is secured to the mounting fixture 306 using a plurality of fasteners 312 which are adjustable in the Z-direction to pull or push the outer radius of the mounting fixture 306, and thus the polishing platen 310, towards or away from the support spindle 302. In some embodiments, the manufacturing system 300 further includes a surface profiler 314, such as a dial gauge, coupled to the cutting tool 308 which may be used to measure the flatness of the polishing platen 310 before, during, and after surface profile modification thereof.

At activity 204, the method 200 includes removing at least a portion of the first polymer layer 150 using the cutting tool 308 to provide a pad-mounting surface 148 having a desired flatness or surface shape. Here, removing at least a portion of the coating layer includes moving one or both of the cutting tool 308 and the polishing platen 310 while maintaining a desired distance in the Z-direction there between to control the depth of material removal. Here, the cutting tool 308 is configured to move radially inward from an outer radius of the polishing platen 310 to at least the center thereof (or vice versa) while the polishing platen 310 rotates there beneath. Thus, the relative motion of the polishing platen 310 and the cutting tool 308 results in a spiral shaped cutting path from the surface of the polishing platen 310, wherein the spiral pattern extends from a central region (e.g., central axis) of the polishing platen 310 to the outside edge of the polishing platen 310. In other embodiments, such as in embodiments where the machine tool is a mill comprising an X-Y translational stage the relative motion of a milling cutting tool and the polishing platen 310 may result in a raster shaped cutting path from the surface of the polishing platen.

The method 200 may be used to modify the profile of a pad-mounting surface 148 of the polishing platen 106 into any desirable shape, such as a substantially planer, convex, or concave shape.

In some embodiments, the method 200 may be used to form a substantially planer pad-mounting surface 148 in which a standard deviation of a plurality of measurements taken at regular intervals there across from a least squares reference plane of the pad-mounting surface 148 is about 25 μm or less. In those embodiments, removing portions of the first polymer layer 150 to provide the substantially planar pad-mounting surface 148 results in variations in the thickness of the coating layer 144 across a diameter of the polishing platen 106. For example, the platen body surface 132 of the portion of the polishing platen 106 shown in FIG. 1C has a concave surface profile, the first polymer layer 150 disposed on the platen body surface 132 has a uniform thickness $t_i$, and the concave surface profile, and the surface of the material coating layer 144 has a substantially planar profile. In FIG. 1C, removing at least a portion of the concave surface of first polymer layer 150 to provide the substantially planer surface of material coating layer 144 results in a material coating layer 144 having a non-uniform thickness ($t_2-t_1$) across at least the portion shown. Thus, in some embodiments a variation in the thickness of the material coating layer 144 across a diameter of the pad-mounting surface 148 is not null. For example, in some embodiments, a variation in the thickness of the coating layer 144 across the pad-mounting surface 148 is about 10 μm or more, such as about 20 μm or more, about 30 μm or more, about 40 μm or more, or about 50 μm or more. Typically, the coating layer 144 has a minimum thickness of about 25 μm or more, such as about 50 μm or more and a maximum thickness of about 250 μm or less.

Figure 4:
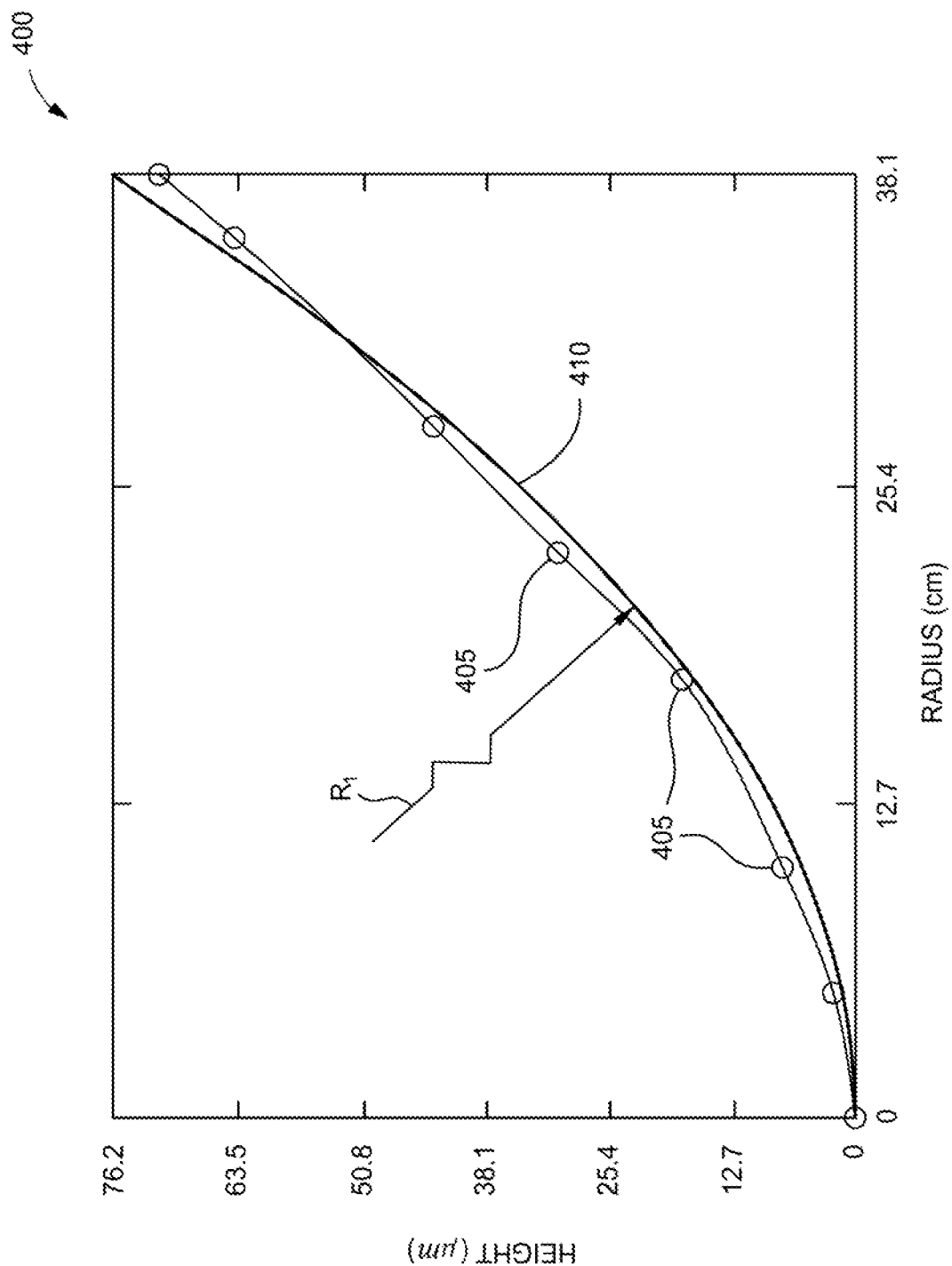
FIG. 4 is a graph depicting a surface profile of a portion of a polishing platen formed according to embodiments described herein.

In some embodiments, the method 200 may be used to form a pad-mounting surface 148 having a concave shape or a convex shape, such as the substantially concave shape shown in FIG. 4.

In some embodiments, the method 200 further includes forming a desirable shape in the platen body surface 132 before forming the first polymer layer 150 thereon. For example, in some embodiments, the method 200 may include machining the platen body 142 to form a concave shape or a convex shape in the platen body surface 132, such as illustrated in FIGS. 5D-5E, before forming the first polymer layer 150 there over.

FIG. 4 is a graph 400 depicting a profile of a pad-mounting surface of a polishing platen formed according to the method 200. The polishing platen in FIG. 4 is sized for use in a multi-platen system where each platen is sized to polish a single 300 mm diameter substrate. The polishing platen has a radius of about 380 mm and is formed to have a polishing pad-mounting surface 405 comprising a substantially concave shape where a difference in a height between a center of the pad-mounting surface 405 and an edge of the pad-mounting surface is about 76 μm. Here, measurements taken along a radius of the pad-mounting surface 405 deviate from a circular convex curve 410 having a radius $R_1$ by about 5 μm or less. Beneficially, the method 200 herein may be used to form pad-mounting surfaces having a substantially concave shape or a substantially convex shape where a plurality of measurements taken at equal intervals across a radius of the pad-mounting surface have a mean deviation from a radius of curvature R1 for the desired shape by about 20 μm or less, such as about 15 μm or less, about 10 μm or less, or about 5 μm or less.

Figure 5A:
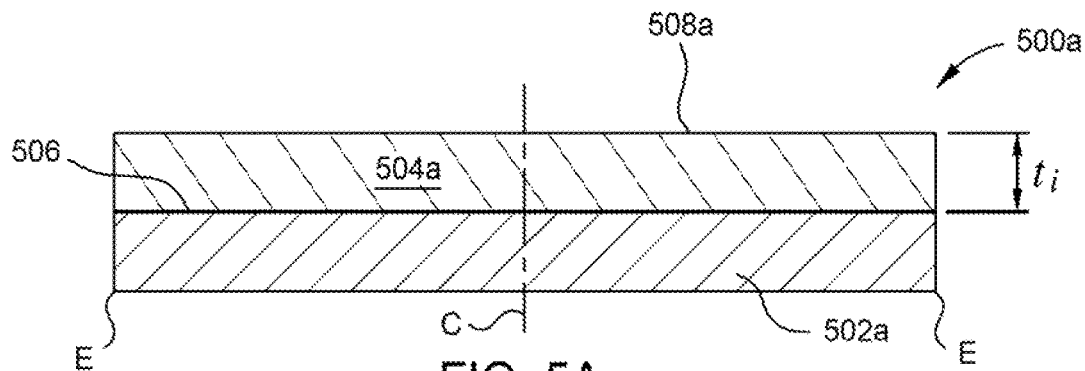
FIGS. 5A-5H are schematic sectional views illustrating various polishing platen surface profiles that may be formed according to embodiments described herein.

FIG. 5A is a schematic sectional view of a polishing platen 500a which includes a platen body 502a having a first polymer layer 504a formed thereon. The platen body 502a and the first polymer layer 504a may be the same or substantially similar to the platen body 142 and first polymer layer 504a described above in FIGS. 1A-1C. For example, in FIG. 5A the first polymer layer 504a is deposited to a substantially uniform thickness $t_i$ having the same uniformity and thickness $t_i$ of the first polymer layer 150 described above in FIG. 1C. As shown, a surface 506 of the platen body 502a is substantially planar, i.e., flat, and thus surface 508a of the polymer layer 504a is also substantially flat. However, it is contemplated that in embodiments herein the surface of the platen body 502a may comprise any one or combination of shapes, such as a hyperbolic paraboloid surface shape (sometimes referred to a saddle shape or a potato chip shape), or a random undulating surface shape. In the examples of a hyperbolic parabolic surface shape, or a random undulating surface shape, a cross sectional view of the platen body 502a may have both concave and convex surface profiles (depending on where the sectional lines are taken).

Figure 5B:
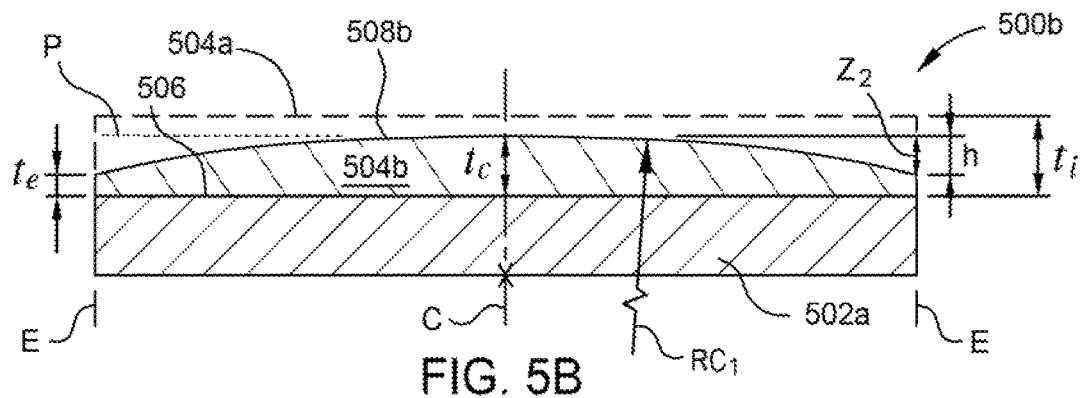
Figure 5C:
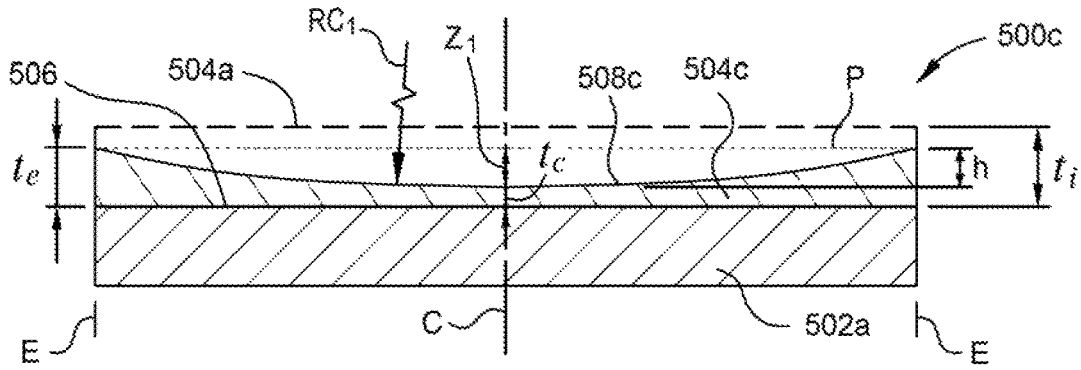
Figure 5D:
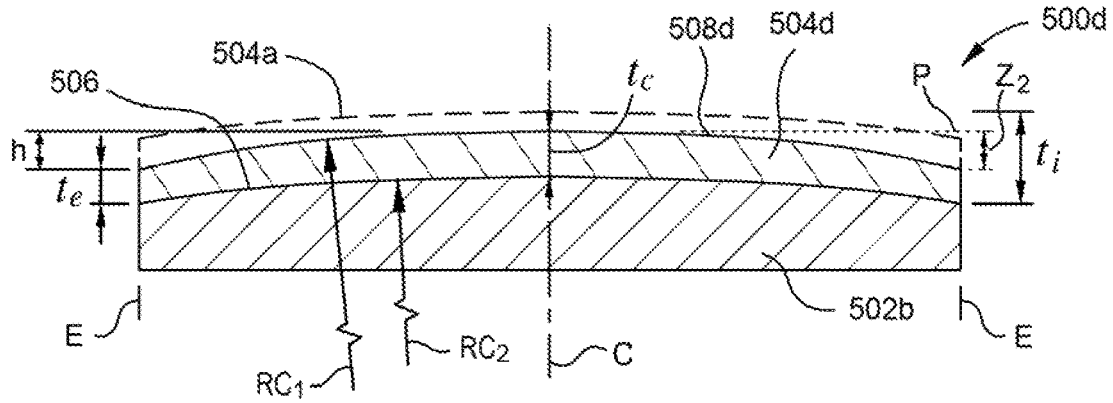
Figure 5E:
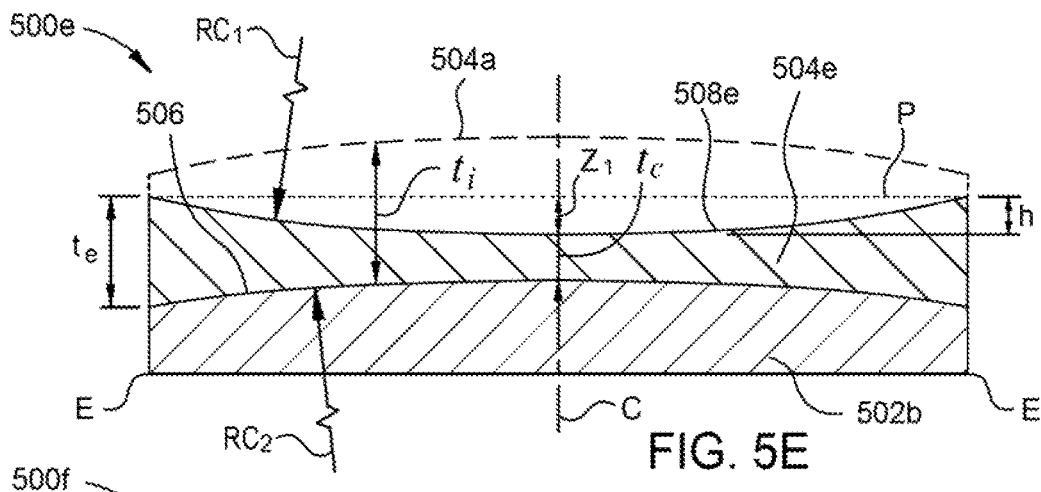

FIGS. 5B-5C are schematic sectional views of respective polishing platens 500b-c formed by removing at least a portion of the first polymer layer 504a using the method 200. In FIG. 5B, the portion of the first polymer layer 504a (shown in phantom) is removed to form a coating layer 504b which provides a pad-mounting surface 508b. The pad-mounting surface 508b is formed to have a substantially radially symmetric convex shape with a radius of curvature $R_1$ across a diameter of the polishing platen 500b. In this embodiment, a height h as measured from the center C of the concave pad mounting surface 508b to a location disposed proximate to the circumferential edge E of the pad-mounting surface 508b is about 10 µm or more, such as about 20 µm or more, about 30 µm or more, about 40 µm or more, about 50 µm or more, about 60 µm or more, or for example about 70 µm or more. Here, the center C of the pad-mounting surface 508b is coplanar with a reference plane P. The pad-mounting surface 508b is spaced apart from the reference plane P by a distance $Z_2$ about a radius proximate to the circumferential edge of the pad-mounting surface 508b. Here, the distance $Z_2$ is substantially the same about the radius so that the reference plane P is parallel to the pad-mounting surface 508b about the radius proximate to the circumferential edge. In this embodiment, the distance $Z_2$ is the same as the height h.

Here, a thickness $t_c$ of the coating layer 504b at the center C of the polishing platen 502b, or at a first radius proximate thereto, is more than the thickness $t_e$ of the coating layer 504b at, or proximate to, a circumferential edge E of the polishing platen 502b. In some embodiments, a difference between the thickness $t_c$ and the thickness $t_e$ is about 10 µm or more, such as about 20 µm or more, about 30 µm or more, about 40 µm or more, about 50 µm or more, about 60 µm or more, about 70 µm or more, about 80 µm or more, or about 90 µm or more.

In FIG. 5C, the portion of the first polymer layer 504a (shown in phantom) is removed to form a coating layer 504c which provides a pad-mounting surface 508c having substantially radially symmetric concave shape with a radius of curvature $R_1$ across a diameter of the polishing platen 500c. Here, a difference in height h of the pad-mounting surface 508c measured from the center C to a circumferential edge E of the polishing platen 500c is about 10 µm or more, such as about 20 µm or more, about 30 µm or more, about 40 µm or more, about 50 µm or more, about 60 µm or more, or for example about 70 µm or more. Here, a thickness $t_c$ of the coating layer 504b at the center C of the polishing platen 502b is less than the thickness $t_e$ of the coating layer 504b at, or proximate to, a circumferential edge E of the polishing platen 502b. In some embodiments, a difference between the thickness $t_c$ and the thickness $t_e$ is about 10 µm or more, such as about 20 µm or more, about 30 µm or more, about 40 µm or more, about 50 µm or more, about 60 µm or more, about 70 µm or more, about 80 µm or more, or about 90 µm or more. In this embodiment, the center C of the pad-mounting surface 508c is spaced apart from the plane P by a distance $Z_1$, which is the same as the height h. The pad-mounting surface 508c is coplanar with the plane P at a radius proximate to the circumferential edge E of the pad-mounting surface 508c.

Typically, $R_1$ may be determined from the equation $R_1^2 = (R_1-h)^2 + r^2$ where r is the radius of the polishing platen. In one example, the radius of curvature $R_1$ for a 381 mm platen (radius) having either a substantially concave or convex pad-mounting surface 508b,c and a height h of about 76 µm is about 952 m.

FIGS. 5D-5E are schematic sectional views of respective polishing platens 500d-e respectively formed by removing at least a portion of the first polymer layer 504a (shown in phantom) using the method 200. FIGS. 5D-E illustrate that a desired shape for the polishing pad-mounting surface 508d-e may be formed independently of the shape of a surface 506 of the platen body 502b disposed there beneath. In FIG. 5D the polishing platen 500d includes a platen body 502b having a surface 506 comprising a convex shape with a radius of curvature $R_2$. Here, removing the portion of the first polymer layer 504a forms a coating layer 504d. The coating layer 504d comprises a pad-mounting surface 508d having a radially symmetric convex shape such as described in FIG. 5B. The radius of curvature $R_2$ may be the same, more, or less than the radius of curvature $R_1$. In FIG. 5E the polishing platen includes the platen body 502b and removing the portion of the first polymer layer 504a forms a coating layer 504e and a pad-mounting surface 508e having a radially symmetric concave shape such as described in FIG. 5C.

In some embodiments, the polishing platens 500d-e are formed by machining the surface 506 of the platen body 502b to have a desired radially symmetric convex shape (as shown) or a desired radially symmetric concave shape (not shown) before forming the first polymer layer 504a there over. Machining the surface 506 of the platen body 502b to have a desired radially symmetric shape prior to the formation of the first polymer layer 504a beneficially reduces the thickness of the first polymer layer 504a required to form the desired concave or convex pad-mounting surface 508d,e. For example, if a concave pad mounting surface 508e is desired, such as shown in FIG. 5E, the platen body 502b may be machined to have a substantially concave surface (not shown) prior to the formation of the first polymer layer 504a. Machining the pad-mounting surface 508d,e before forming the first polymer layer 504a there over reduces the chance of a mismatch of desired shapes between the pad-mounting surface 508e and the surface 506 of the platen body 502b, such as shown in FIG. 3E.

In FIG. 5E, the surface 506 of the platen body 502b has surface shape that may have resulted from deformation of the platen body 502b during the relatively high temperature process used to form the first polymer layer 504a there over. As a result, the initial thickness $t_i$ of the first polymer layer 504a required to form a desired concave pad-mounting surface 508e is greater than a thickness that would be needed if the surface 506 of the platen body 502b there beneath had a generally concave shape. Thus, in embodiments where a convex or concave pad-mounting surface 508e is desired, forming a generally radially symmetric convex or concave shape in the surface 506 of the platen body 502b reduces the chances of mismatched surface shapes following formation of the first polymer layer 504a. Reducing the chances of mismatched surface shapes following the relatively high-temperature formation process of the first polymer layer 504a beneficially reduces the required initial thickness $t_i$ of the first polymer layer 504a to achieve the desired shape of the pad-mounting surface 508e.

Figure 5F:
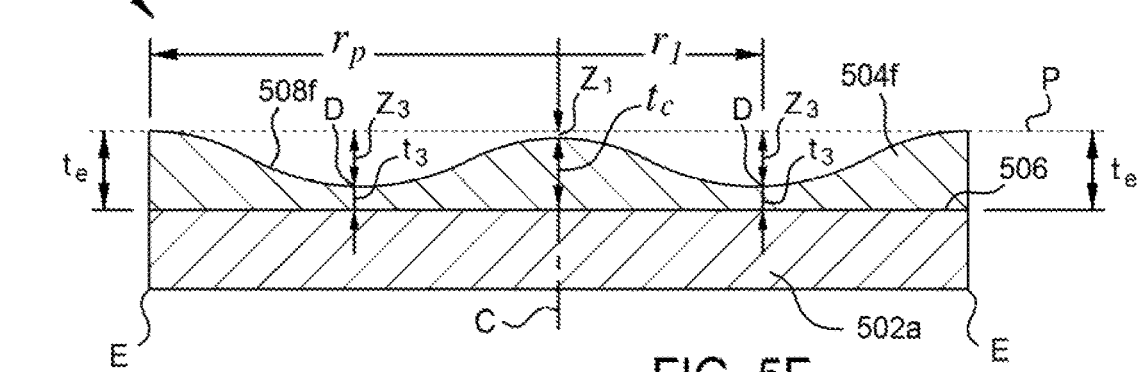
Figure 5G:
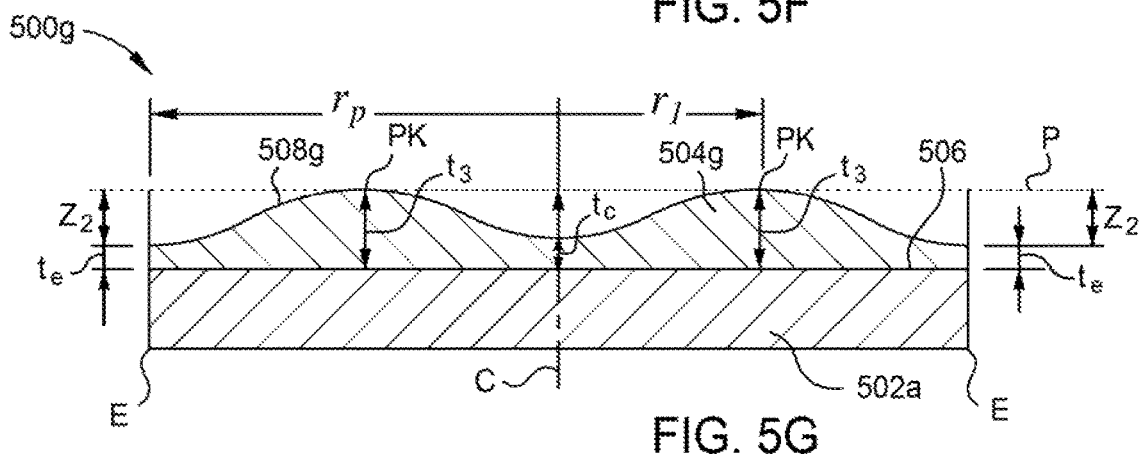
Figure 5H:
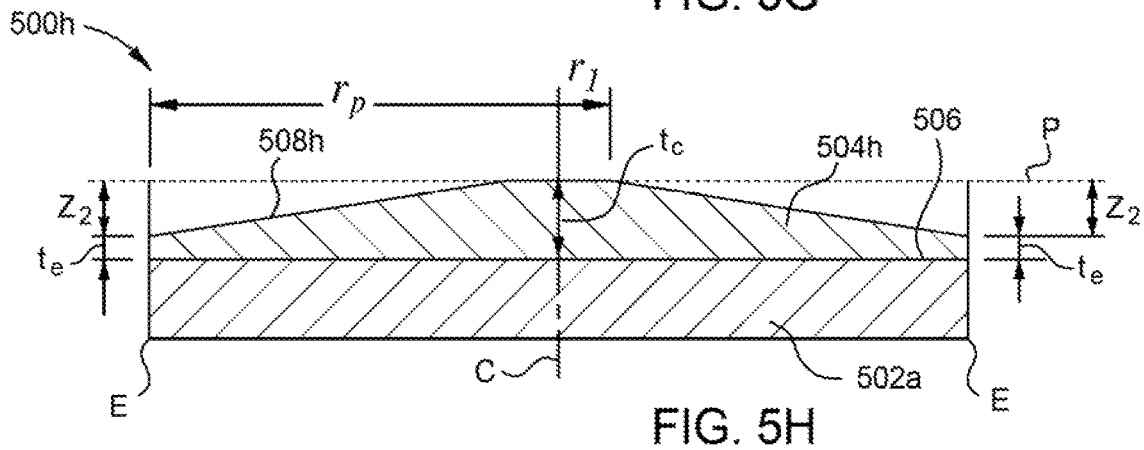

FIGS. 5F-5H are schematic sectional views of respective polishing platens 500f-h illustrating alternate shapes of pad-mounting surfaces 508f-h that may be formed in the respective coating layers 504f-h using the methods set forth herein. In FIGS. 5F-5H the shapes of the pad-mounting surface 508f-h are formed by removing at least a portion of the first polymer layer 504a (shown in FIG. 5A) using the methods set forth herein. In other embodiments, the shapes of the pad-mounting surfaces 508f-h may be formed by machining the surface 506 of the platen body 502a to have a desired shape before forming the first polymer layer 504a there over. In some embodiments, desired shapes of the pad-mounting surfaces 508f-h are formed by both machining the surface 506 and removing at least portions of the first polymer layer 504a formed thereon. In some embodiments, the profile of the surface 508f-h, as measured relative to the reference plane P, includes one or more radially symmetric features that are desirably formed by machining the surface 506 and/or removing at least portions of the first polymer layer 504a formed thereon. As illustrated in FIGS. 5F-5H, the surfaces 508f-h may include at least one of a radially symmetric depression D (FIG. 5F) and radially symmetric peak PK (FIG. 5G) positioned between the center C and the edge E of the platen 500g. The radially symmetric depressions and radially symmetric peaks thus form annular features that are symmetric relative to the central axis C of the platen.

In FIG. 5F, the pad-mounting surface 508f has a platen radius $r_p$ and the reference plane P is coplanar with the pad-mounting surface 508f at or proximate to the radius $r_p$. The center C of the pad-mounting surface 508f is disposed below the plane P and is spaced apart therefrom by a distance $Z_1$ of about 10 μm or more, such as about 20 μm or more, about 30 μm or more, about 40 μm or more, about 50 μm or more, about 60 μm or more, or for example about 70 μm or more. In other embodiments, the center C of the pad-mounting surface 508f extends above the plane P by a distance of about 10 μm or more, such as about 20 μm or more, about 30 μm or more, about 40 μm or more, about 50 μm or more, about 60 μm or more, or for example about 70 μm or more. In other embodiments, the center C of the pad mounting surface 508f is substantially coplanar with the plane P.

Here, the pad-mounting surface 508f comprises an annular portion (at radius $r_1$) disposed between the center C, or a radius proximate thereto, and a radius at or proximate to the circumferential edge E of the pad-mounting surface 508f. The annular portion is spaced apart from the plane P by a distance $Z_3$ which is greater than the distance $Z_1$, i.e., the annular portion of the pad-mounting surface 508f at the radius $r_1$ is lower than both the center C of the pad-mounting surface 508f, or a first radius proximate to the center C, and the radius at, or proximate to, the circumferential edge E. Here, distance $Z_3$ is about 10 μm or more, such as about 20 μm or more, about 30 μm or more, about 40 μm or more, about 50 μm or more, about 60 μm or more, or for example about 70 μm or more. In some embodiments, the low point of the annular portion, here at radius $r_1$, is disposed between about ⅓ to about ⅔ of a radial distance from the center C to the circumferential edge E.

In some embodiments, e.g., where the pad-mounting surface 508f is shaped by removing at least portions of a polymer layer 504a (FIG. 5A) formed on the platen body 502a, a thickness $t_3$ at the third radius is less than both the thicknesses $t_c$ and $t_e$. In some embodiments, a difference between the thickness $t_3$ and one or both of the thickness $t_c$ and the thickness $t_e$ is about 10 μm or more, such as about 20 μm or more, about 30 μm or more, about 40 μm or more, about 50 μm or more, about 60 μm or more, about 70 μm or more, about 80 μm or more, or about 90 μm or more.

Here, the center C of the pad-mounting surface 508f is disposed below the plane P and is spaced apart therefrom by a distance $Z_1$ of about 10 μm or more, such as about 20 μm or more, about 30 μm or more, about 40 μm or more, about 50 μm or more, about 60 μm or more, or for example about 70 μm or more. In other embodiments, the center C of the pad-mounting surface 508f extends above the plane P by a distance of about 10 μm or more, such as about 20 μm or more, about 30 μm or more, about 40 μm or more, about 50 μm or more, about 60 μm or more, or for example about 70 μm or more. In other embodiments, the center C of the pad mounting surface 508f is substantially coplanar with the plane P.

It should be noted that the position of the reference plane P with respect to the uppermost surfaces of the pad-mounting surfaces 508b-h described herein is not particularly limiting and description of surface heights as above or below the reference plane P may be modified with respect to the definition thereof. For example, in an alternate description of FIG. 5F, a reference plane (not shown) may be defined as coplanar with the pad-mounting surface 508f at the radius $r_1$ and the surface heights at the both the center C and circumferential edge E of the pad mounting surface 508f would thus be above the reference plane.

In FIG. 5G, the pad-mounting surface 508g comprises an annular portion (at third radius $r_1$) disposed between the center C, or a first radius proximate thereto, and a second radius at or proximate to the circumferential edge E of the pad-mounting surface 508g. The annular portion is coplanar with the reference plane P. The pad mounting surface 508g at the center C, or at a first radius proximate thereto, is disposed below the reference plane P and is spaced apart therefrom by a distance $Z_1$. The pad-mounting surface 508g at a radius at, or proximate to, the circumferential edge E of the pad-mounting surface is disposed below the reference plane P and is spaced apart therefrom by a distance $Z_2$ which may be the same or different as the distance $Z_1$. Thus, the annular portion of the pad-mounting surface 508g at the third radius $r_1$ is higher than both the center C of the pad-mounting surface 508g, or a first radius proximate to the center C, and the second radius at, or proximate to, the circumferential edge E. Here, distance $Z_1$ is about 10 μm or more, such as about 20 μm or more, about 30 μm or more, about 40 μm or more, about 50 μm or more, about 60 μm or more, or for example about 70 μm or more. In some embodiments, the annular portion at the third radius $r_1$, is disposed between about ⅓ to about ⅔ of a radial distance from the center C to the circumferential edge E.

In some embodiments, e.g., where the pad-mounting surface 508g is shaped by removing at least portions of a polymer layer 504a (FIG. 5A) formed on the platen body 502a, a thickness $t_3$ at the third radius is more than both the thicknesses $t_c$ and $t_e$. In some embodiments, a difference between the thickness $t_3$ and one or both of the thickness $t_c$ and the thickness $t_e$ is about 10 μm or more, such as about 20 μm or more, about 30 μm or more, about 40 μm or more, about 50 μm or more, about 60 μm or more, about 70 μm or more, about 80 μm or more, or about 90 μm or more.

In FIG. 5H at least portions of the pad-mounting surface 508h slope upwardly from a second radius at the circumferential edge E to a first radius r1 disposed at, or proximate to, the center C. The reference plane P is parallel to a surface of the pad-mounting surface 508h along a radius thereof, e.g., along the radius $r_p$. Here, the pad-mounting surface 508h has a generally conical shape when viewed in cross section so that a circular portion of the pad-mounting surface 508h concentrically disposed about the center C and having the radius $r_1$ is coplanar with the reference plane P. Here, the thicknesses $t_c$ and $t_e$ and the distance $Z_2$ may be in the same ranges as in any one or combination of the other embodiments described herein.

In some embodiments, the thicknesses of the coating layers at the different radial locations from the center C of the pad-mounting surfaces set forth herein are averaged from a plurality of thickness measurements taken at a corresponding plurality of equidistant locations along the respective radius. For example, the thicknesses set forth herein may be averaged from 3 or more thickness measurements taken at locations that are equidistant from one another as measured along a respective radius, such as measurements from 4 or more equidistant locations, or from 5 or more equidistant locations.

In some embodiments, the distances $Z_1$, $Z_2$, and $Z_3$ of the pad-mounting surfaces 508b-h from the plane P at the different radial locations from the center C are averaged from a plurality of measurements taken at a corresponding plurality of equidistant locations along the respective radius. For example, the distances $Z_1$, $Z_2$, and $Z_3$ may be respectively averaged from 3 or more measurements taken at locations that are equidistant from one another as measured along a respective radius, such as 4 or more measurements from equidistant locations, or 5 or more measurements from equidistant locations.

Figure 6:
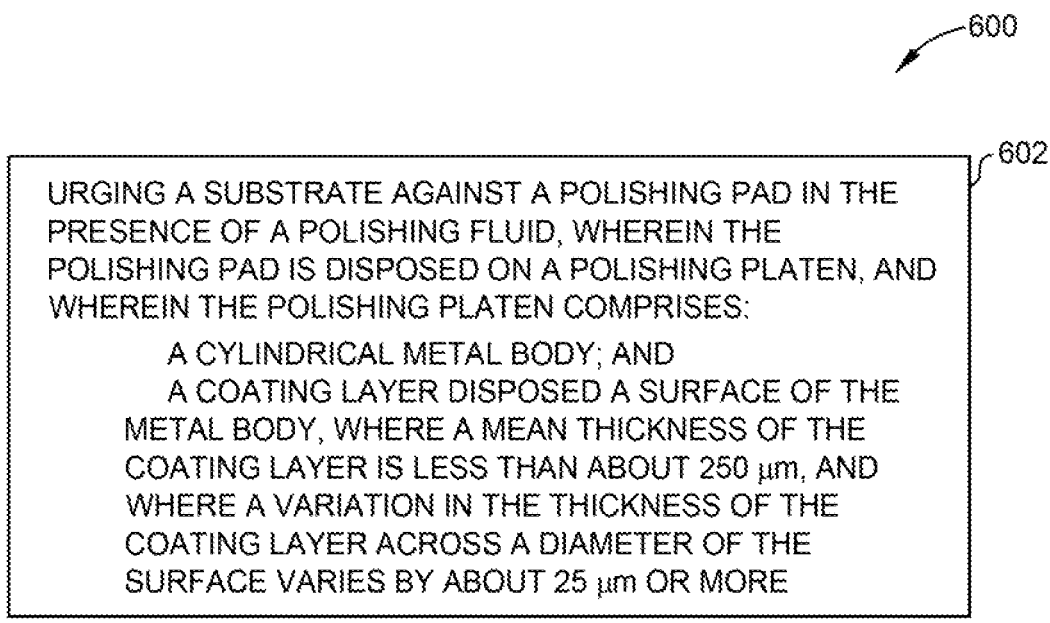
FIG. 6 is a diagram illustrating a method of polishing a substrate using a polishing platen formed according to embodiments described herein.

FIG. 6 is a diagram illustrating a method of polishing a substrate using a polishing platen formed according to embodiments described herein. At activity 602 the method 600 includes urging a substrate against a polishing pad in a presence of a polishing fluid. Here, the polishing pad is disposed on a polishing platen. The polishing platen may be formed according to any one or combination of the embodiments set forth herein. The polishing platen includes a cylindrical metal body having a low-adhesion-material coating layer formed thereon. Here, the coating layer is disposed on a surface of the metal body to form a polishing pad-mounting surface, a difference in height between a center of the pad-mounting surface and along a radius radially outward form the center is about 25 μm or more. The coating layer may be formed to provide a pad-mounting surface having any of the shapes and/or features described above.

Embodiments herein provide for the manufacturing of polishing platens having low-adhesion material surfaces with controlled and repeatable flatness profiles and/or other desired surface shapes. Beneficially, the polishing platens herein may be formed to have convex or concave shapes that may be used to fine-tune the polishing performance of one or more individual polishing systems for a particular substrate polishing process.

While the foregoing is directed to embodiments of the present disclosure, other and further embodiments of the disclosure may be devised without departing from the basic scope thereof, and the scope thereof is determined by the claims that follow.

The invention claimed is:

1. A polishing platen, comprising:
   a cylindrical metal body with an upper platen surface and a center around which the cylindrical metal body is configured to rotate, the upper platen surface having a radially symmetric convex shape about the center; and
   a polymer coating layer disposed upon the upper platen surface of the cylindrical metal body and having had a portion of the polymer coating layer removed to form a polymer pad-mounting surface having a first surface height at a first radius and a second surface height at a second radius, wherein:
   the first surface height is greater than the second surface height,
   the polymer coating layer comprises a fluoropolymer,
   both the first radius and the second radius are disposed outward of the center and the second radius is disposed radially outward of the first radius,
   the first and second surface heights are measured as distances from a reference plane that is parallel to the pad-mounting surface at the first radius, and
   a difference between the first and second surface heights is about 25 μm or more.

2. The polishing platen of claim 1, wherein the first radius is disposed at the center.

3. The polishing platen of claim 1, wherein
   the polymer pad-mounting surface has a third surface height at a third radius,
   the third radius is disposed radially between the first and the second radius,
   the second surface height is coplanar with the reference plane, and
   the first and third surface heights are both disposed below the reference plane.

4. The polishing platen of claim 3, where the first surface height is disposed above the reference plane and the third surface height is disposed below the reference plane.

5. The polishing platen of claim 4, where the first surface height is disposed coplanar with the reference plane.

6. The polishing platen of claim 3, where the third radius is in a range of from about ⅓ to ⅔ of the second radius.

7. The polishing platen of claim 1, wherein
   the polymer coating layer has a first thickness at the first radius and a second thickness at the second radius, and
   a difference between the first thickness and the second thickness about 25 μm or more.

8. The polishing platen of claim 1, wherein a profile of the polymer pad-mounting surface is different from a profile of a surface of the cylindrical metal body on which the polymer coating layer is disposed.

9. The polishing platen of claim 1, where the polymer pad-mounting surface has a third surface height at a third radius, the third radius is disposed radially between the first and the second radius, the third surface height is coplanar with the reference plane, and the first and second surface heights are both disposed below the reference plane or are both disposed above the reference plane.

10. The polishing platen of claim 9, where the first surface height is disposed above the second surface height.

11. The polishing platen of claim 9, where the third radius is in a range of from about ⅓ to ⅔ of the second radius.

12. The polishing platen of claim 1, where the polymer pad-mounting surface has a third surface height at a third radius, the third radius is disposed radially between the first and the second radius, the pad-mounting surface is coplanar with the reference plane in between the first radius and the third radius, and the surface height declines linearly from the third radius to the second radius.

13. A polishing platen, comprising:
   a cylindrical metal body having a radially symmetric convex shape about a center of the cylindrical metal body; and
   a polymer coating layer disposed on the cylindrical metal body and having had a portion of the polymer coating layer removed to form a polymer pad-mounting surface and further disposed on a radially outward facing circumferential surface of the cylindrical metal body to form a continuous polymer coating layer, wherein:
   the polymer coating layer comprises a fluoropolymer, a thickness of the polymer coating layer changes from a first radius of the pad-mounting surface to a second radius disposed radially inward from the first radius, and a difference between a thickness at the first radius and a thickness at the second radius is about 25 μm or more.

14. The polishing platen of claim 13, wherein the thickness at the first radius is averaged from a plurality of thickness measurements taken at a corresponding plurality of equidistant locations along the first radius and the thickness at the second radius is averaged from a plurality of thickness measurements taken at a corresponding plurality of equidistant locations along the second radius.

15. The polishing platen of claim 13, wherein
the thickness of the polymer coating layer changes from the first radius to a third radius, wherein the third radius is disposed between the first radius and the second radius, and a thickness at the third radius is greater than both the thicknesses at the first radius and the second radius.

16. The polishing platen of claim 13, wherein
the thickness of the polymer coating layer changes from the first radius to a third radius,
the third radius is disposed between the first radius and the second radius, and
a thickness at the third radius is greater than both the thicknesses at the first radius and the second radius.

17. The polishing platen of claim 13, wherein
the polymer pad-mounting surface has a first surface height at the first radius and a second surface height at the second radius,
the first and second surface heights are measured as distances from a reference plane that is parallel to the pad-mounting surface at the first radius, and
a difference between the first and second surface heights is about 25 μm or more.

* * * * *